Figure 1:
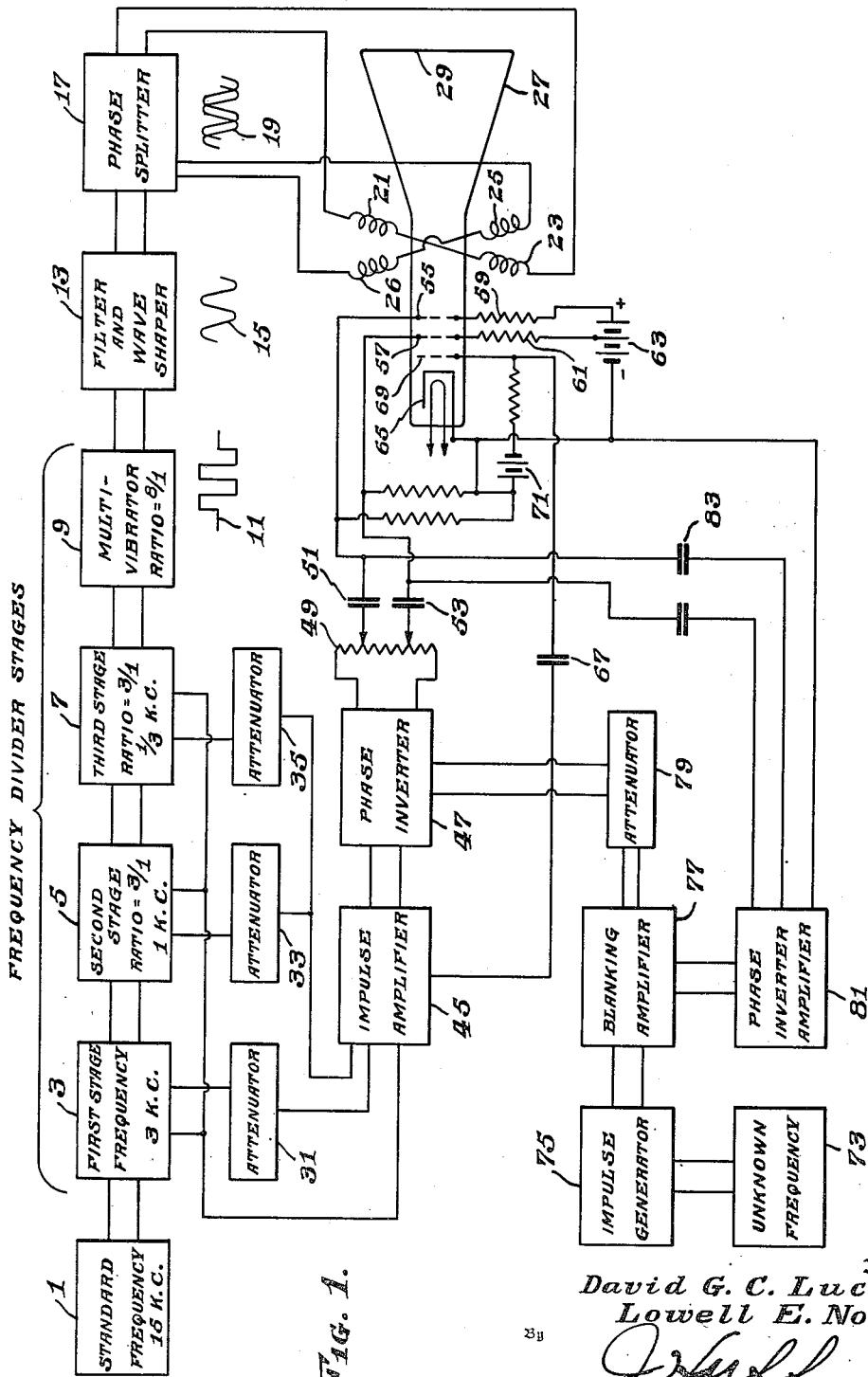

June 21, 1938.  D. G. C. LUCK ET AL  2,121,359
APPARATUS FOR TIMING OF PERIODIC EVENTS
Filed March 31, 1937   3 Sheets-Sheet 2

Inventors
David G. C. Luck
Lowell E. Norton
By
Attorney

June 21, 1938.　　　D. G. C. LUCK ET AL　　　2,121,359
APPARATUS FOR TIMING OF PERIODIC EVENTS
Filed March 31, 1937　　　3 Sheets-Sheet 3
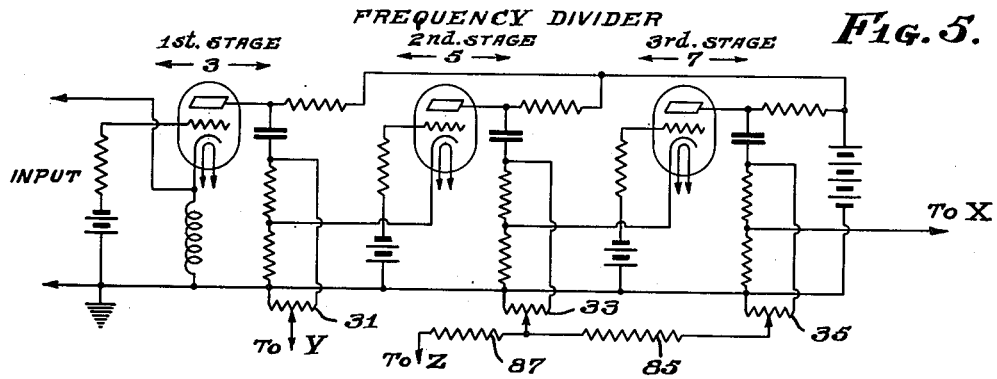
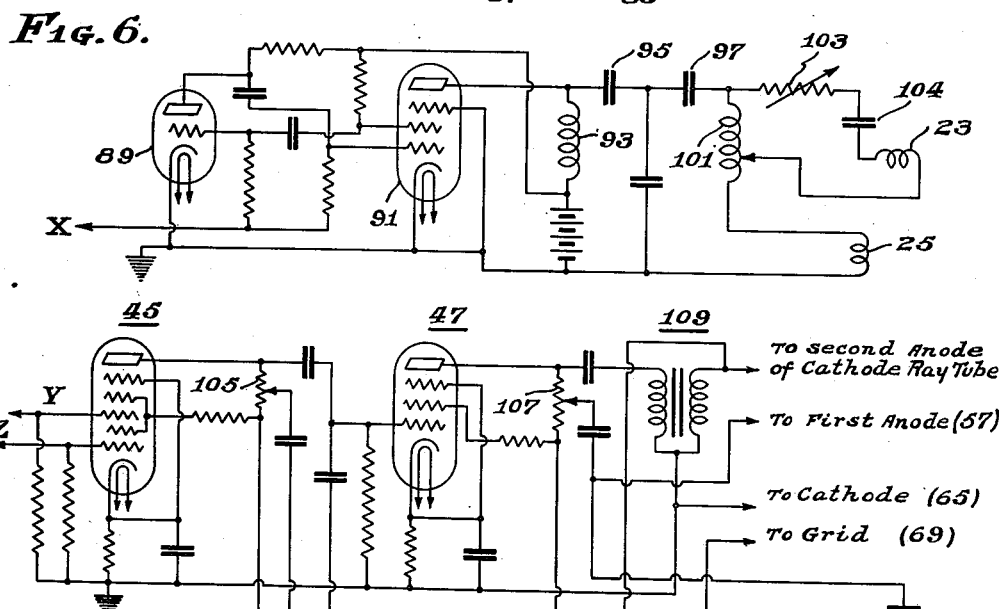
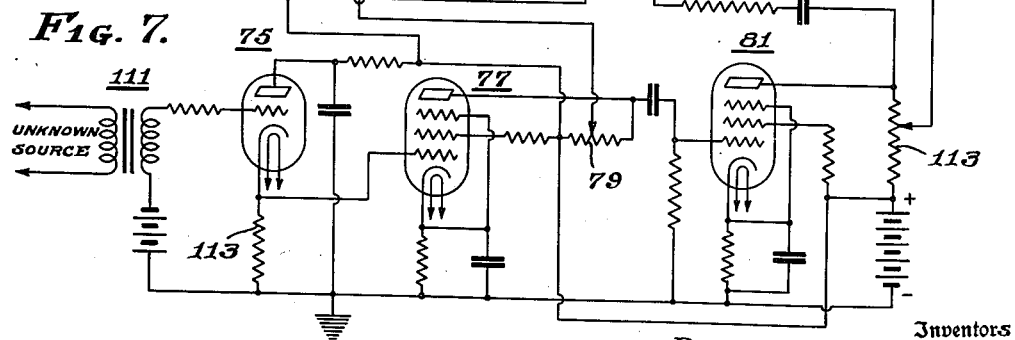
Inventors
David G. C. Luck
Lowell E. Norton
By
Attorney Patented June 21, 1938

2,121,359

UNITED STATES PATENT OFFICE 2,121,359

APPARATUS FOR TIMING OF PERIODIC EVENTS

David G. C. Luck, Haddon Heights, and Lowell E. Norton, Collingswood, N. J., assignors to Radio Corporation of America, a corporation of Delaware Application March 31, 1937, Serial No. 134,074

8 Claims. (Cl. 172—245)

Our invention relates to an apparatus for timing periodic events. More particularly, our invention provides means for marking a standard timing scale on a cathode ray tube by means of the cathode ray itself and comparing the time, phase, or the like, of an event by means of an indication on said scale. We are aware that phasing may be indicated by various applications of cathode ray tubes. In general, such phasing indication depends upon the geometric trace which the cathode ray leaves on the fluorescent screen, or upon some electromechanical device which rotates the phases, whereby the amount of rotation may be determined. The former method of indicating phase is not entirely satisfactory because of the difficulties of determining phase angles by relation to geometric patterns. The second arrangement gives a more precise determination of phase angles but requires manual adjustment.

In another system the cathode ray is rotated at a known rate. A spot is impressed on the fluorescent screen by an unknown signal and the relative rates of rotation of the spot and the cathode ray may be used to indicate timing or phasing. If the last-described method is used with an arbitrary scale, it is difficult to obtain precise indications because of unsymmetrical tube construction and lack of uniformity in the rate at which the cathode ray intercepts the arbitrary scale.

Our invention contemplates impressing a timing or angular scale on the fluorescent screen of the cathode ray tube by the cathode ray itself. Lack of symmetry in the deflecting means within the tube will not affect the accuracy of the dividing marks because the electrical angle or time between the marks is determined by the electrical characteristics of the apparatus and associated circuits. That is to say, the marks themselves may not be equally spaced in terms of the physical angle but the electrical or time angle between the indicating marks is accurately determined. We are aware that it has been previously proposed to indicate a scale by means of a fundamental frequency and to provide subdivisions of this scale by selecting harmonic frequencies of the fundamental. This method of scale indication has the disadvantage that a slight change in the fundamental frequency wave form may cause a very serious change in the harmonic phases and hence in the position of the subdivisions. In our invention we propose to obtain the subdivisions of the scale by frequency division which can be made as constant as the fundamental source of frequency.

One of the objects of our invention is to provide means whereby a cathode ray tube may be used to indicate the timing of periodic events.

Another object of our invention is to provide means whereby the cathode ray tube may be used to indicate phase angles.

A further object of our invention is to provide means whereby a rotating cathode ray is used to mark a circular scale with radial indications.

A still further object of our invention is to provide means whereby a circularly rotating cathode ray leaves a series of radial division marks on the screen of the cathode ray tube and whereby a periodically occurring electrical impulse leaves a trace adjacent said scale to indicate its epoch.

Figure 2:
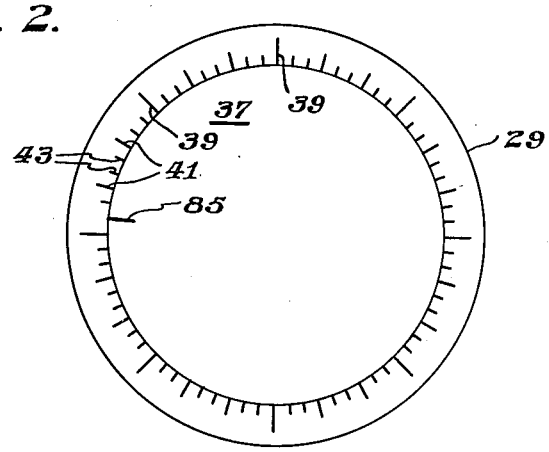
Figure 3:
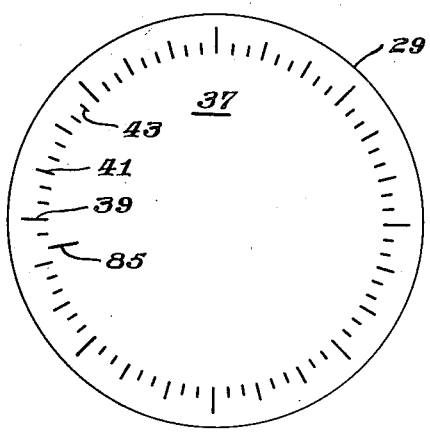
Figure 4:
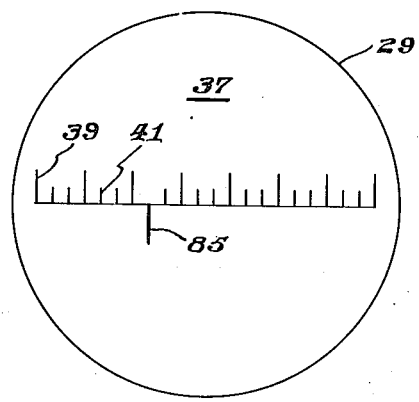

Our invention may be best understood by reference to the accompanying drawings, in which Figure 1 is a schematic diagram of one embodiment of our invention, Figure 2 illustrates the cathode ray tube embodying a scale established in accordance with our invention, Figures 3 and 4 illustrate modifications in the timing scale impressed by the cathode ray upon the screen of the cathode ray tube, Figure 5 is a schematic circuit diagram of the first three stages of the frequency divider, Figure 6 is a circuit diagram of the multivibrator, filter, and phase splitter, and Figure 7 is a circuit diagram of the impulse amplifier, phase inverter, impulse generator, blanking amplifier, and phase inverting amplifier.

Referring to Fig. 1, an alternating current of standard frequency is generated by a magnetostrictive oscillator 1, a crystal oscillator, or the like, which, by way of example, may have a frequency of 15 kilocycles per second. The output from the standard frequency generator 1 is impressed upon a frequency divider 3. This device may divide the first frequency by any predetermined ratio. For example, 5 to 1 will produce current impulses at the rate of 3 kilocycles per second from the initial 15 kilocycle source. A second frequency divider 5 is connected to the output of the first stage of frequency division. The second stage of frequency division may be a ratio of 3 to 1, which will provide current impulses at the rate of 1 kilocycle per second. The output of the second stage of frequency division is impressed upon a third stage 7 which may have a ratio of 3 to 1 and a resulting output of ⅓ kilocycle per second. The third stage of frequency division may be connected to the input of a multivibrator 9, which is arranged to operate at a ratio of 8 to 1 although other ratios may be used.

Since the multivibrator produces a substantially square wave form 11, we have found it desirable to filter and wave-shape the output by a suitable network represented by the reference numeral 13. The output of the wave-shaper and filter is a current of substantially sinusoidal output represented by the graph 15. This sinusoidal current is impressed upon a phase splitter 17, whose output includes currents which are 90° with respect to each other, as indicated by the graphs 19. One of these currents is impressed upon the cathode ray deflecting coils 21, 23, while the current of the other phase is impressed upon a second set of cathode ray deflecting coils 25—26, which are disposed at an angle of 90° with respect to the first-mentioned deflecting coils 21, 23. The effect of these fields is to rotate the cathode ray in cathode ray tube 27 about a circular path. Such rotation of the cathode ray is well known to those skilled in the art. The rate of rotation is equal to the frequency of the rotating field established by the deflecting coils 21, 23, 25 and 26.

Having thus described the method of stepping down the standard frequency and rotating the cathode ray in a circular path, we shall now describe the method of obtaining the radial marks on the fluorescent screen 29 of the cathode ray tube 27. The outputs of the frequency divider stages 3, 5 and 7 are respectively impressed upon attenuators 31, 33, 35. The function of the attenuators is to determine the relative amplitudes of the impulses which cause the radial marks 39 to be impressed on the cathode ray screen 29 of Fig. 2. It will be seen that the marks 39, by way of example, divide the cathode ray screen into eight large divisions. Each of the large divisions is subdivided into three divisions by shorter marks 41 and each of these intermediate divisions is divided into three parts by smaller indicating marks 43. The proper adjustment of the attenuators 31, 33, 35 determines the relative length of the radial dividing marks of the scale 37.

The output of the attenuators 31, 33 and 35 is impressed upon an impulse amplifier 45. The output currents of the impulse amplifier 45 are not in the correct phase to be impressed upon the cathode ray tube anodes, if the radial markers are to be impressed in an outward direction. This difficulty may be overcome by a phase inverter 47 whose output includes the potentiometer 49. Suitable points on the potentiometer 49 are connected through blocking capacitors 51, 53 to the first 55 and second 57 anodes of the cathode ray tube 27. These anodes are also biased positively through resistors 59, 61, which are connected to a source of accelerative voltage derived from battery 63, whose negative terminal is connected to the cathode 65. The output of the impulse amplifier 45 is impressed through blocking capacitor 67 upon the control grid 69 of the cathode ray tube to thereby bias the grid in the positive sense to increase the brightness of the radial marker traced on the fluorescent screen of the tube. The control grid may be initially biased negatively by means of battery 71, or the like.

The apparatus thus far described rotates the cathode ray which is preferably adjusted to leave a very faint or even no circular trace on the screen and, at intervals, which are determined by the frequency divider stages, the cathode ray is deflected so as to increase the radius of the circular trace and thereby leave the radial traces 39, 41, 43 on the screen. It will be seen that the control grid 69 and the anodes 55, 57 impress potentials to effect the radial traces as described. While the cathode ray is moving around the scale at a rate which is determined by a frequency, which is an integral multiple of the standard frequency, the radial timing scale appears to be steady due to the persistence of vision and the character of the fluorescent screen.

In order that a current of unknown frequency or of unknown period may be compared with the standard frequency, we provide connections from the unknown frequency source 73 to an impulse generator 75. The output of the impulse generator is impressed upon what we term a blanking amplifier 77. The output circuit of the blanking amplifier is connected to an attenuator 79 which is, in turn, connected to the phase inverter 47. The blanking amplifier 77 impresses, on the phase inverter 47, potential impulses at a rate determined by the currents in the unknown frequency source. When these unknown frequency impulses coincide with one of the scale marking impulses, the effect is to oppose the potentials which determine the radial marks 39, 41, 43 to thereby blank out the particular mark which happens to coincide with the unknown frequency mark.

If the relative rates of the standard frequency and the unknown frequency coincide or bear an integral relation to each other, the same mark will always be blanked out. If, however, the unknown frequency differs, successive marks around the scale 37 will be blanked out, giving the appearance of clockwise or counter-clockwise motion. The rate at which the blanking mark appears to move around the scale determines the frequency difference between the unknown current and the known current. Depending on the clockwise or counter-clockwise movement of the mark, an observer may thus determine whether the known frequency is higher or lower than the unknown.

Inasmuch as it is difficult to observe the rotation of the blanking mark, we have found that, if the blanking impulse is made to coincide with a potential impulse which would leave a cathode ray radial line on the inner portion of the circular scale 37, a much better observation may be made. Such impulse may be obtained by connecting a phase inverter amplifier 81 to the output of the blanking amplifier 77. The output of the phase inverter amplifier 81 is impressed through the blocking capacitors 83 upon the anodes 55, 57. This current is in the proper phase to leave a positive inward radial trace mark 85, which rotates about the scale 37 in step with the blanking impulse. We have found that the exact period when the blanking impulse and the inner radial mark 85 occurs may be determined with excellent precision. This also permits interpolation.

In Fig. 5 we have illustrated a suitable circuit for the first three stages of the frequency divider. These stages preferably include gas tubes which are commercially known as type 885. The attenuators 31, 33 and 35 are respectively connected to the output circuits of stages 3, 5, and 7. The adjustable lead from the first output attenuator is connected to the No. 3 grid of the pulse amplifier 45. The variable contacts in the potentiometers 33 and 35 are joined together by a resistor 85 of high impedance and through a second resistor 87 to the No. 1 grid of the pulse amplifier 45, which will be hereinafter described. Inasmuch as frequency dividers are known to those skilled in the art, no detailed description is necessary. The operation of the frequency dividing circuits is more fully described in U. S. Patent No. 2,092,887, which issued on application Serial No. 47,675, filed October 31, 1935, entitled "Impulse operated relay", which was filed by David G. C. Luck and assigned to the same assignee as the present application. Alternatively, frequency division may be obtained from a train of suitable multivibrators.

In Fig. 6, the multivibrator 9, filter, wave shaper 13 and phase splitter 17 are illustrated by a conventional circuit diagram. The vacuum tubes 89 and 91, together with the associated resistance, capacity coupling, represents a conventional multivibrator. The output of the third stage of the frequency divider (see Fig. 5) is connected to the input circuit of the multivibrator as shown. The output from the multivibrator is impressed across the inductor 93 of the filter and wave shaper. This filter is comprised of the inductor 93, series capacitors 95 and 97, shunt capacitor 99 and a second inductor 101, which may be adjustable. An adjustable series resistor 103 and a series capacitor 104 are connected in series with deflecting coils 23 and 24, which series elements are connected in shunt with the filter inductor 101. The other deflecting coils 25 and 26 are connected in series with the filter inductor 101. Adjustment of the connection to inductor 101 and the series resistor 103 will determine the required characteristics of the phase splitter, which is thus made a part of the filter network. In practice, it should be understood that the coils 23 and 25 are preferably divided into two pairs of deflecting units which are positioned at right angles with respect to each other.

A circuit diagram, Fig. 7, represents one embodiment of the circuit for the pulse amplifier 45, the phase inverter 47, a second pulse amplifier 75, a blanking amplifier 77, and a phase inverting amplifier 81. The No. 1 grid of the pulse amplifier 45 is connected to the adjustable contact on the attenuator 33 through the resistor 87. The No. 3 grid of the pulse amplifier 45 is connected to the adjustable contact on the attenuator 33, which is in the output of the first frequency divider stage 3. The pulse amplifier 45 has an output circuit which includes a potentiometer 105. The voltage variations across this potentiometer are impressed upon the input circuit of the phase inverter 47. The output circuit of the phase inverter includes a potentiometer 107. The voltage variations across potentiometer 107 are impressed through a step-up transformer 109 on the second anode of the cathode ray tube. The adjustable contact of the potentiometer 107 is connected through a blocking capacitor to the first anode of the cathode ray tube. The adjustable contact on the potentiometer 105 in the output circuit of the pulse amplifier 45 is connected through a blocking capacitor to the control grid of the cathode ray tube.

The foregoing circuit, together with the constant frequency generator 1 and the circuits of Figs. 5 and 6, will impress upon the cathode ray tube a radial scale similar to the scales shown in Figs. 2 and 3. To obtain the required indication from the unknown source, additional circuits are shown in Fig. 7. These additional circuits represent a connection to the unknown source 73, which is coupled through a transformer 111, or the like, to the input circuit of an impulse generator 75. This amplifier is preferably a gas tube of the type 885 which may be used to derive a sharply defined voltage impulse from the unknown source. The output of the pulse generator is obtained from the cathode circuit resistor 113 and is impressed on the input circuit of the blanking amplifier 77. The output circuit of the blanking amplifier 77 includes an attenuator 79, the adjustable contact of which is connected through a blocking capacitor to the input circuit of the phase inverter 47 which has been previously described.

The function of the blanking amplifier and attenuator is to derive an impulse which will be substantially equal in magnitude and opposite in phase to the marking impulses so that when the two impulses coincide the marking impulses will be blanked out or erased to thereby indicate the angular or timing position of the unknown impulse with respect to the marking scale. The output circuit of the blanking amplifier is also connected to the input circuit of the phase inverting amplifier 81. The function of this amplifier is to produce an impulse which is derived from the unknown frequency source. This impulse is of sufficient amplitude and proper phase to deflect the cathode ray toward the center of the circular trace and place thereon a radial indicating mark. We have found it desirable to impress this impulse on the second anode and the first anode to maintain proper focusing conditions in the cathode ray tube. These impulses are derived from the potentiometer 113 and are impressed upon the first and second anodes through suitable blocking capacitors.

While numerous circuit arrangements may be employed, we believe that an understanding of some of the elements shown in the foregoing circuits may help in the adjustment of the apparatus. The impulses which are impressed from the frequency divider upon the No. 1 and No. 3 grids of the pulse amplifier 45 drive the grids negative with respect to the cathode. The pulse amplifier tube 45 is preferably adjusted to have a high value of plate current for the "no signal" condition. When the negative potential is impressed on the grid, the voltage which is in the resistor 105 is in a positive sense. The phase inverter tube 47, under conditions of "no input signal", is biased to cut off its plate current. When the positive impulse from the pulse amplifier is impressed upon the phase inverter 47, the voltage across the potentiometer 107 in the output circuit of the phase inverter will become less positive. These less positive potentials are impressed on the first and second anodes of the cathode ray tube, which permits the cathode ray to deflect outwardly for the duration of the impulse, thus leaving radial traces whose amplitude may be adjusted as previously described. At the same time that the negative impulse is applied to the first and second anodes, a positive impulse from the potentiometer 105 in the output circuit of the pulse amplifier 45 is impressed upon the grid of the cathode ray tube to thereby increase the cathode ray intensity with resulting increase in brilliance in the radial traces. It will be apparent that the relative intensity of the circular trace and the radial trace may be so adjusted that the circular trace is very faint, as compared with the radial traces, or omitted entirely, as shown in Fig. 3.

The unknown impulse is derived through the impulse generator 75 and impressed upon the blanking amplifier 77, whose function has been previously described. If desired, the phase inverting amplifier 81 may be omitted and the blanking impulse will serve to indicate the movement of the cathode ray caused by the unknown current impulse. However, we prefer to impress, by means of the phase inverting amplifier 81, the radial marking impulse, which will travel around the circular trace in accordance with the frequency of the current from the unknown source. If the phase inverting amplifier is used, the connections from the blanking amplifier which are used to blank out the radial scale markings may be omitted. However, we prefer to use both types of indication, in view of the improved accuracy of observing the timing, when the known and unknown impulses coincide.

It will occur to those skilled in the art that a linear scale such as shown in Fig. 4 may be substituted for the radial scale of Figs. 2 and 3. If a linear scale is desired, the rotating field may be omitted and in its place a conventional linear sweep circuit is used. The impulses for the sweep circuit may be derived in any conventional manner and are preferably locked in with the current of known frequency to thereby maintain a steady scale upon the cathode ray screen. In particular, the multivibrator supplying the circular sweep may merely be replaced by a normal sweep generator. Instead of using deflecting coils, the circular sweep may be produced by a normal disposition of electrostatic deflecting plates fed with suitable two phase voltage. Furthermore, the radial marks may be applied in various ways, as by current impulses in a toroidal coil coaxial with the cathode ray tube or by voltage impulses applied to cylindrical or conical electrodes coaxial with the cone swept out by the cathode ray beam.

Numerous practical applications of our invention will occur to those skilled in the art. By way of example, our invention may be readily applied to the timing of watches, clocks, and the like. Our invention may also be applied to the measurement of the phase angle between two currents. Our invention may be applied to radio compass indications, course beacons and similar indicators.

We claim as our invention:

1. In a periodic timing device a cathode ray tube including a fluorescent screen, means for producing and rotating a cathode ray of said tube at a known uniform rate about a circular trace, means for adjusting the radius of said circular trace, means for changing said radius at uniform time intervals to form radial traces thereon, said radial traces forming a uniform time scale, and means for impressing impulses occurring at an unknown rate upon said circular trace so that said unknown impulses leave an indication on said screen which may be compared with said uniform time intervals.

2. In a device of the character of claim 1 means for biasing said cathode ray toward the center of said trace by means of a potential derived from said impulses of unknown frequency.

3. In a device of the character of claim 1 means for blanking out one of said radial traces when said radial trace and one of said impulses, occurring at said unknown rate, coincide.

4. In a device of the character of claim 1 means for extinguishing said radial traces when said radial traces and said impulses, occurring at said unknown rate, coincide and means for biasing said cathode ray toward the center of said trace by means of a potential derived from said impulses of unknown rate.

5. In a timing device, a cathode ray tube including a fluorescent screen, a current varying periodically at a known uniform rate, means for obtaining uniformly timed impulses from said current, means for deriving a rotating field from said currents for rotating said cathode ray, means for adjusting the radius of the trace formed on said screen by said rotating ray, means including said uniformly spaced impulses for changing the radius of said trace on said screen to form thereon a timing scale, a second current varying at an unknown rate, means for impressing impulses derived from said second current to deflect said ray to thereby indicate by a trace on said screen the rate of variation of said second current as compared with said timing scale.

6. In a periodic timing device a cathode ray tube including ray deflecting means and a fluorescent screen, means for producing and biasing a cathode ray on said screen at uniform time intervals to form discrete timing marks on said screen to form a scale thereon, and means for impressing impulses occurring at an unknown rate upon said cathode ray so that said unknown rate impulses will leave an indication on said screen which may be compared with said uniform time intervals.

7. In a periodic timing device a cathode ray tube including ray deflecting means and a fluorescent screen, means for controlling traces on said screen which are not used in timing, means for producing and biasing a cathode ray on said screen at uniform time intervals to form timing marks on said screen, means for impressing impulses occurring at an unknown rate upon said cathode ray so that said unknown rate impulses will leave an indication on said screen which may be compared with said uniform time intervals, and means for blanking out one of said timing marks when said timing mark and said indicating mark from said unknown rate impulses coincide.

8. In a periodic timing device, a cathode ray tube including ray deflecting means and a fluorescent screen, means for producing and biasing a cathode ray at uniform time intervals to form discrete timing marks on said screen to thereby form a scale, means for impressing impulses occurring at an unknown rate upon said cathode ray so that when an unknown rate impulse coincides with one of said time marks the said timing mark will be blanked out.

DAVID G. C. LUCK.
LOWELL E. NORTON.